(12) United States Patent
Foo (10) Patent No.: US 11,899,510 B2
(45) Date of Patent: Feb. 13, 2024

(54) BREAKAWAY TAB FOR DEBUGGER CONNECTOR ACCESS

(71) Applicant: Micron Technology, Inc., Boise, ID (US)

(72) Inventor: Boon Khian Foo, Singapore (SG)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/731,603

(22) Filed: Apr. 28, 2022

(65) Prior Publication Data

US 2023/0350469 A1    Nov. 2, 2023

(51) Int. Cl.
  *G06F 1/18* (2006.01)

(52) U.S. Cl.
  CPC .................................... *G06F 1/181* (2013.01)

(58) Field of Classification Search
  CPC ............. G06F 1/187; G06F 1/181; G06F 1/16
  See application file for complete search history.

(56) References Cited

U.S. PATENT DOCUMENTS

| | | | | |
|---|---|---|---|---|
| 5,087,998 | A * | 2/1992 | Oishi | G11B 23/08714 360/60 |
| 5,418,672 | A * | 5/1995 | Tischler | G11B 23/042 360/60 |
| 5,717,571 | A * | 2/1998 | Helot | G06F 1/1656 439/372 |
| 6,267,608 | B1 * | 7/2001 | Yagi | H05K 5/0247 439/910 |
| 7,058,435 | B2 * | 6/2006 | Yamazaki | H04M 1/0274 455/575.8 |
| 7,742,294 | B2 * | 6/2010 | Gadau | G06F 1/1616 439/142 |
| 7,798,828 | B2 * | 9/2010 | Kuo | H04M 1/0283 439/138 |
| 8,199,470 | B2 * | 6/2012 | Yang | H05K 5/03 455/575.8 |
| 8,926,345 | B2 * | 1/2015 | Kim | G06K 13/0825 439/142 |
| 9,071,018 | B2 * | 6/2015 | Suh | G06K 19/07741 |
| 9,444,188 | B2 * | 9/2016 | Cox | H01R 13/64 |
| 11,013,106 | B1 * | 5/2021 | Schrey | H05K 1/142 |
| 11,602,206 | B1 * | 3/2023 | Troedson | A45C 11/00 |
| 2011/0286173 | A1 * | 11/2011 | Moore | G11B 33/08 29/458 |
| 2020/0269936 | A1 * | 8/2020 | da Rosa | B62D 33/08 |
| 2021/0176886 | A1 * | 6/2021 | Wang | G06F 1/187 |

* cited by examiner

*Primary Examiner* — Rockshana D Chowdhury
(74) *Attorney, Agent, or Firm* — NICHOLSON DE VOS WEBSTER & ELLIOTT LLP (57) ABSTRACT

A memory enclosure is described that includes a debugger connector access portion in the memory enclosure. The memory enclosure further includes a breakaway tab which at least partially covers the debugger connector access portion. The memory enclosure further includes at least two anchoring joints connecting the breakaway tab to a portion of the memory enclosure surrounding the debugger connector access portion, the anchoring joints adapted to break upon application of a breaking force causing the breakaway tab to break away from the memory enclosure and allow a debugger tool access through the exterior of the memory enclosure to a debugger connector situated in the interior of the memory enclosure.

20 Claims, 8 Drawing Sheets

BREAKAWAY TAB FOR DEBUGGER CONNECTOR ACCESS

TECHNICAL FIELD

The present disclosure generally relates to a memory subsystem enclosure, and more specifically, relates to a breakaway tab in a memory subsystem enclosure for debugger connector access.

BACKGROUND ART

A memory subsystem can include one or more memory devices that store data. The memory devices can be, for example, non-volatile memory devices. In general, a memory subsystem may have an enclosure.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to memory enclosures. Examples of memory devices are described below in conjunction with FIG. 1. In general, these memory devices may benefit from an enclosure protecting the working components of the memory devices from external elements.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Memory devices conventionally include (are enclosed within) an enclosure to reduce exposure so that foreign particulate cannot enter and affect the performance of the memory device and otherwise provide a form factor for use and protection of the memory device. By way of example, foreign particles may interact with a memory device and build up and become charged. These foreign particles, if in contact with functional components of the memory device may lead to malfunction in the memory device.

Memory devices, however, may malfunction for different reasons and it may be necessary to have direct access to the memory devices through a debugger connector/port to evaluate and correct the malfunction. The access to the debugger connector, however, is typically restricted to people with proper knowledge of the inner workings of the memory subsystem. End users without proper knowledge may cause further malfunction or complete failure in attempting to access the debugger connector.

Traditionally, the restriction of access to the debugger connector was accomplished by adhering an adhesive label over a debugger access portion, such that the adhesive label can be peeled off to access the debugger connector. Defects in the adhesive label, however, are difficult to capture, making quality assurance of the adhesive label inefficient and flawed. These adhesive labels are prone to peeling off or getting damaged, such that they are no longer useful for the intended purpose. The problems with these labels are due to limited surface area on the memory enclosure, degradation in the label adhesives, and manufacturing and other defects with the perforation cut of the adhesive label.

Aspects of the present disclosure address the above and other deficiencies by introducing a breakaway tab into the memory enclosure. The breakaway tab can cover the debugger access portion to prevent access by foreign particulate and end users but is also able to be easily removed for access when required. The breakaway tab will ensure efficiency and accuracy in the production and quality assurance of the memory enclosures.

Figure 1:
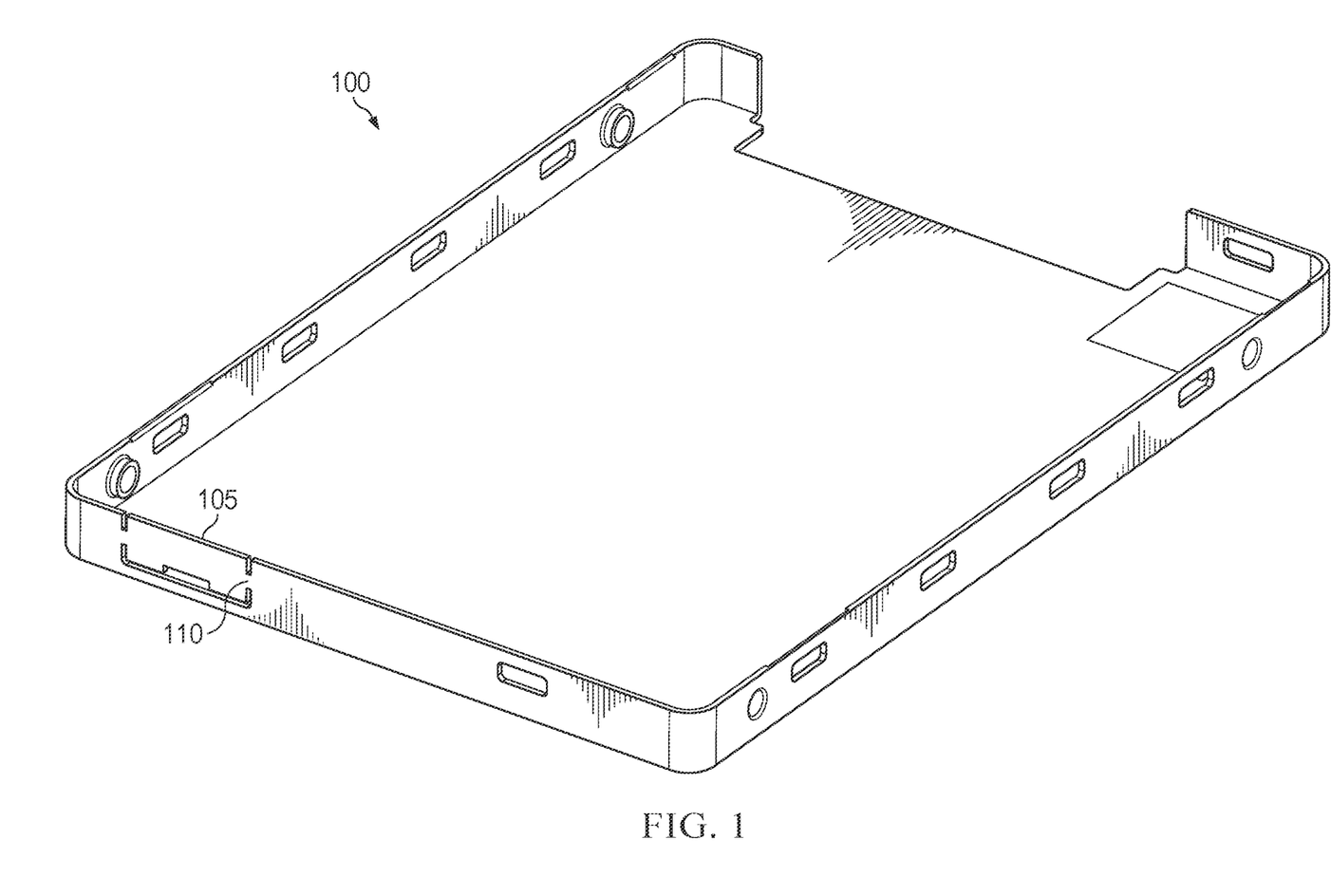
FIG. 1 illustrates an example memory enclosure that includes a breakaway tab in accordance with some embodiments of the present disclosure.

FIG. 1 illustrates an example outer portion of memory enclosure 100 that includes a breakaway tab 105 in accordance with some embodiments of the present disclosure. Memory enclosure 100 may enclose memory device which can be a storage device, a memory module, or a hybrid of a storage device and memory module.

Some examples of non-volatile memory devices include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the one or more memory device can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Examples of a storage device also include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM). Memory enclosure 100 may further contain other components relating to the function of the one or more non-volatile memory devices.

FIG. 1 illustrates one example of an outer portion of memory enclosure 100 which can be coupled to one or more memory devices (not illustrated). As used herein, "coupled to" or "coupled with" generally refers to a connection between components, which can be an indirect communicative connection or direct communicative connection (e.g., without intervening components), whether wired or wireless, including connections such as electrical, optical, magnetic, etc. "Coupled to" or "coupled with" may also refer to a physical connector between components, such as a mounting of on one component into another through use of mounting hardware.

As shown in FIG. 1, memory enclosure 100 may comprise a breakaway tab 105 connected to the memory enclosure 100 through two or more anchoring joints 110. The two or more anchoring joints 110 may be situated on opposite sides of breakaway tab 105 to prevent unintended breaking of breakaway tab 105.

Figure 5:
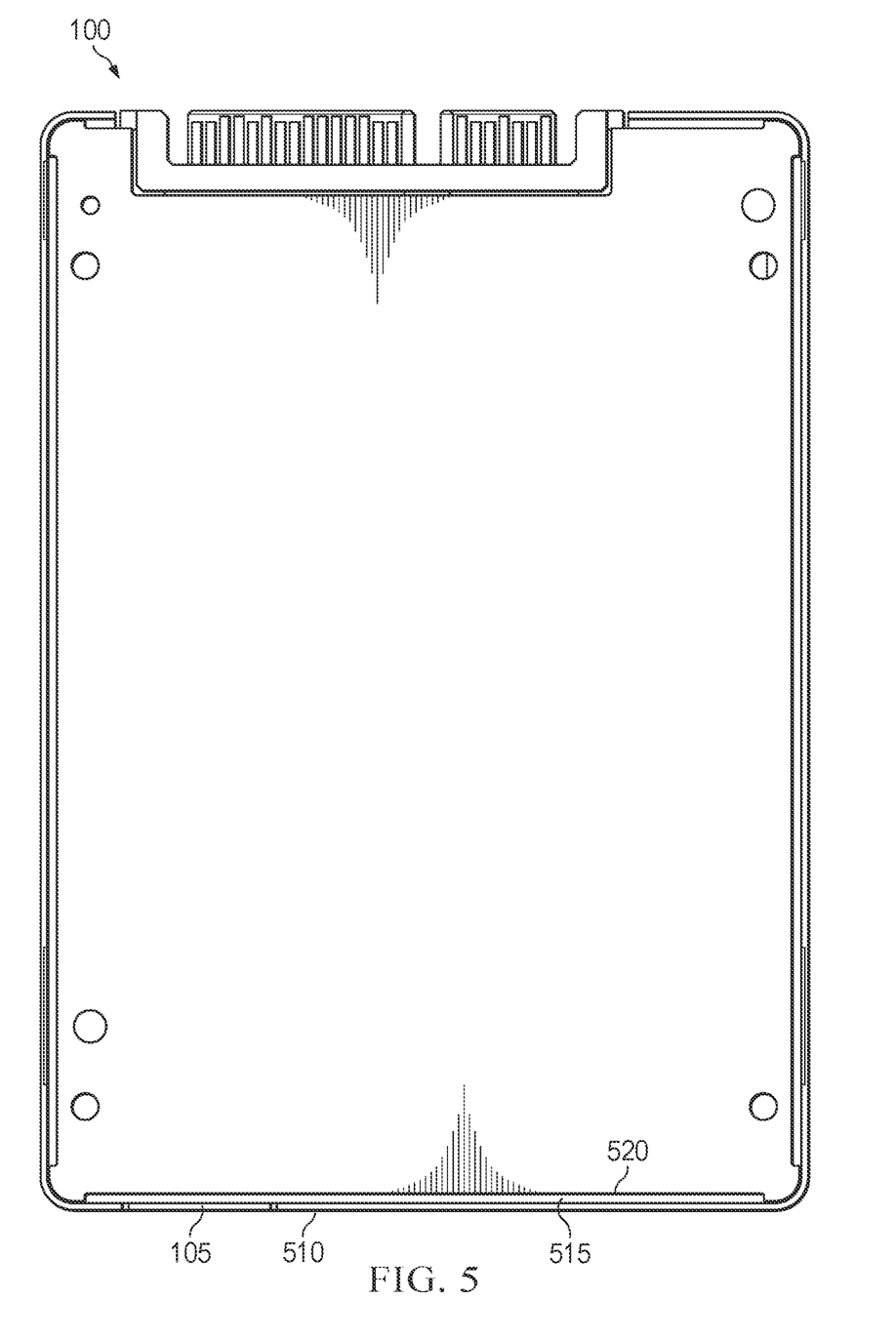
FIG. 5 illustrates a bottom view of an example memory enclosure that includes a breakaway tab in accordance with some embodiments of the present disclosure.

Although FIG. 1 illustrates an outer portion of the memory enclosure 100, it would be appreciated by one of ordinary skill in the art that to sufficiently protect the one or more memory devices, memory enclosure 100 would also include an inner portion of the enclosure coupled with the illustrated outer portion of the enclosure such that the one or more memory devices are substantially enclosed by the entirety of memory enclosure 100. FIG. 5 shows an embodiment illustrating outer and inner portions that together make up memory enclosure 100.

Memory enclosure 100 may be made of a material designed to provide sufficient protection for the one or more memory devices while also being small and lightweight. For example, memory enclosure 100 can be made mostly of a plastic or a lightweight metal such as aluminum and other similar metals or alloys. In some embodiments, memory enclosure 100 is made of a sheet metal.

In some embodiments, memory enclosure 100 is made of a material that serves as a heatsink or a material that is coupled to a heatsink to allow the dissipation of heat generated by the one or more memory devices. For example, memory enclosure 100 can be made of a material with a high heat capacity and high thermal conductivity. Memory enclosure 100 may also be coupled to a heat sink through use of thermal paste or coupling means with similar heat transfer properties.

Memory enclosure 100 is designed to enclose sensitive components. For example, such components can include SSDs, HDDs, other memory devices or components which may be sensitive to orientation, vibration, shock, and other mechanical stressors. In such embodiments, memory enclosure 100 is made of a material sufficient to substantially prevent such mechanical stressors while still providing as small and lightweight of a package as possible. For example, memory enclosure 100 may be made of a metal sturdier than typical sheet metal. In such embodiments, memory enclosure 100 may also have adequate mounting hardware to substantially prevent such mechanical stressors.

As shown in FIG. 1, breakaway tab 105 is attached to memory enclosure 100 such that it can be detached when necessary. Breakaway tab 105 is therefore situated in a cut-out portion of memory enclosure 100. The cut-out portion of memory enclosure 100 may be a debugger access portion such that when breakaway tab 105 is not in place, a debugger tool may be inserted through the exterior of memory enclosure 100 and into an interior of memory enclosure 100 to, e.g., connect to a debugger connector or port.

In some embodiments, the location of the cut-out portion of memory enclosure 100 therefore corresponds with the location of a debugger connector/port on the one or more memory devices. Likewise, the approximate size and shape of the cut-out portion of the memory enclosure 100 may correspond with a debugger tool that may be inserted through memory enclosure 100 and into the debugger connector on the one or more memory devices.

Figure 2:
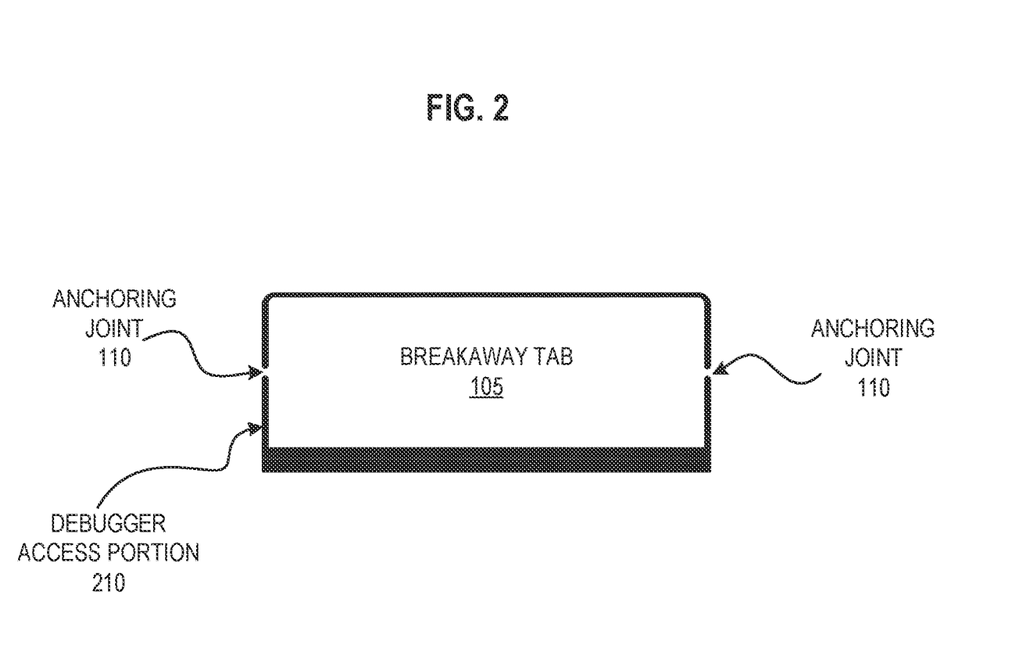
FIG. 2 and FIG. 3 illustrate example breakaway tabs in accordance with some embodiments of the present disclosure.

FIG. 2 illustrates an example breakaway tab 105 in accordance with some embodiments of the present disclosure. Breakaway tab 105 may be substantially rectangular in shape such that breakaway tab 105 has four different sides. Of the four sides, breakaway tab 105 may have two pairs of two sides in which the sides of each pair are opposite of one another and approximately equal in length. In some embodiments, one pair of two sides are shorter in length than the other pair of two sides, lending to the rectangular shape of breakaway tab 105.

In some embodiments, as shown in FIG. 2, one of the sides in the longer pair of two sides has round mitered corners such that the sides of the longer pair are of slightly different lengths but still substantially the same length.

As shown in FIG. 2, breakaway tab 105 is surrounded by a cut-out portion, such as debugger access portion 210. Debugger access portion 210 may be a cut-out in a portion of memory enclosure 100. When breakaway tab 105 is detached from memory enclosure 100, debugger access portion 210 allows access of a debugger tool from the exterior of the memory enclosure into a debugger connector in the interior of the memory enclosure 100.

There may be two or more anchoring joints 110 coupled to breakaway tab 105 and memory enclosure 100 such that the two or more anchoring joints 110 connect breakaway tab 105 to memory enclosure 100.

The two or more anchoring joints 110 may be positioned or situated in the memory enclosure such that the two or more anchoring joints 110 break upon the application of a breaking force, causing breakaway tab 105 to break away from the memory enclosure 100 and allowing access through debugger access portion 210 to a debugger connector in the interior of the memory enclosure 100.

In some embodiments, the breaking force is a force applied to breakaway tab 105, anchoring joints 110, and/or memory enclosure 100. The breaking force is a force sufficiently large to cause the anchoring joints 110 to break allowing breakaway tab 105 to break away from the memory enclosure 100.

In some embodiments, the width of the anchoring joints 110, defined as the shortest distance from the section of debugger access portion 210 above the anchoring joints 110 to the section of debugger access portion 210 below the anchoring joints, is small enough such that the breaking force does not cause further damage to memory enclosure 100 other than breaking anchoring joints 110. For example, the width of anchoring joints 110 can be between two and two and a half times the width of the enclosure material. For a typical sheet metal enclosure with a width of 0.6 mm, the width of anchoring joints 110 could therefore be between 1.2 mm and 1.5 mm in order to prevent denting, cracks, breakage, warping, or other such damage to memory enclosure 100 especially in the area surrounding debugger access portion 210.

In some embodiments, the breaking force is a prying force. For example, the breaking force may be the result of a user using pliers or similar gripping tool to grab breakaway tab 105 and apply a prying force causing anchoring joints 110 to break and further causing breakaway tab 105 to break away from memory enclosure 100. Such a prying force may be a force applied causing breakaway tab 105 to rotate around an axis running through anchoring joints 110 such that the rotational prying force causes the top of breakaway tab 105 to move towards the interior of memory enclosure 100 and the bottom of breakaway tab 105 to move away from the interior of memory enclosure 100. Such a prying force may also be applied in the opposite direction such that the top of breakaway tab 105 moves away from the interior of memory enclosure 100 and the bottom of breakaway tab 105 moves towards the interior of memory enclosure 100. In some embodiments, the breaking force is the result of repeated iterations of such a rotational prying force or a single application of such force so long as the result is that the anchoring joints 110 break and breakaway tab 105 breaks away from memory enclosure 100.

In some embodiments, the prying force is the result of a user using a screwdriver or a similar implement to insert near or around breakaway tab 105 such as into an area of debugger access portion 210 surrounding breakaway tab 105. The user may then apply a prying force causing the proximate side of breakaway tab 105 to rotate away from the interior of memory enclosure 100 and further causing anchoring joints 110 to break and breakaway tab 105 to break away from the memory enclosure 100. As explained above, the breaking force may be the result of repeated iterations of such a prying force or a single application of such force so long as the result is that the anchoring joints 110 break and breakaway tab 105 breaks away from memory enclosure 100.

Figure 3:
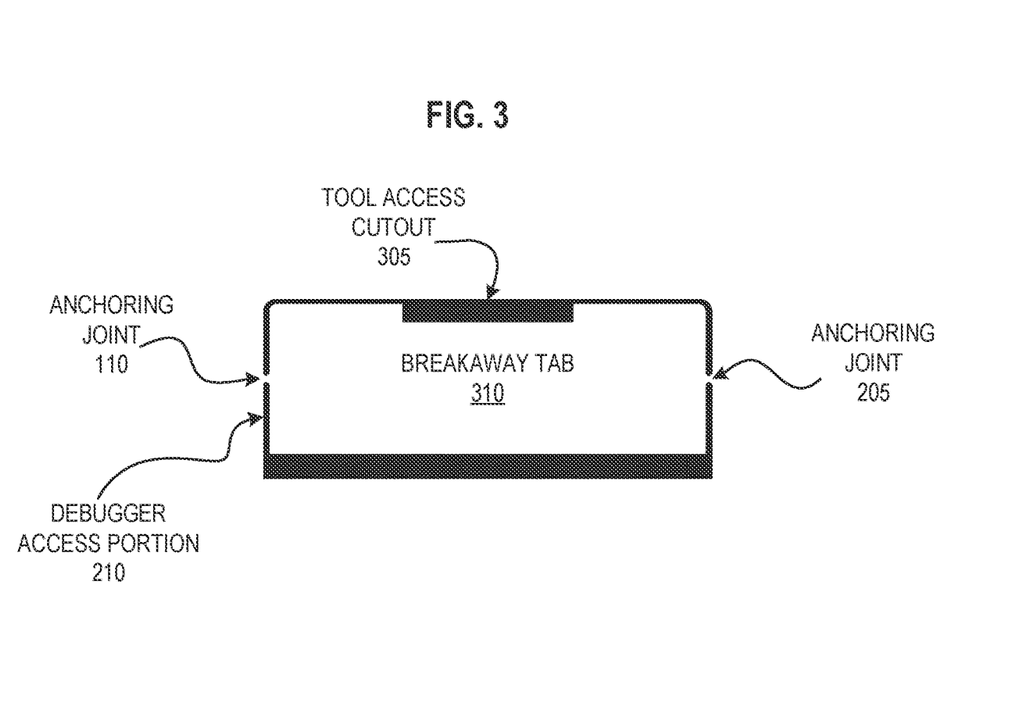

In some embodiments, as shown in FIG. 3, the breakaway tab, such as breakaway tab 310 has a tool access cutout 305 situated on or near breakaway tab 310. Tool access cutout 305 may be a cut out of a portion of breakaway tab 310 such that there is a larger opening to debugger access portion 210 in the area where tool access cutout 305 is situated. In some embodiments, tool access cutout 305 is sufficiently large and appropriately situated as to allow the insertion of a small screwdriver or similar implement. In other embodiments, tool access cutout 305 is sufficiently large and appropriately situated as to allow the insertion of small pliers or a similar tool. In some embodiments, tool access cutout 305 is situated such that a user can insert a tool into tool access cutout 305 to apply a breaking force.

In some embodiments, the breaking force is a twisting or torsion force. For example, the breaking force may be the result of a user inserting small screwdriver or similar implement into tool access cutout 305 and applying a twisting or torsion force causing anchoring joints 110 to break and further causing breakaway tab 105 to break away from memory enclosure 100. Such a twisting or torsion force may be a force applied causing breakaway tab 105 to rotate in a clockwise or counterclockwise motion around an axis defined by the body of the tool inserted into tool access cutout 305. In some embodiments, the breaking force is the result of repeated iterations of such a rotational torsion force or a single application of such force so long as the result is that the anchoring joints 110 break and breakaway tab 105 breaks away from memory enclosure 100.

Figure 4:
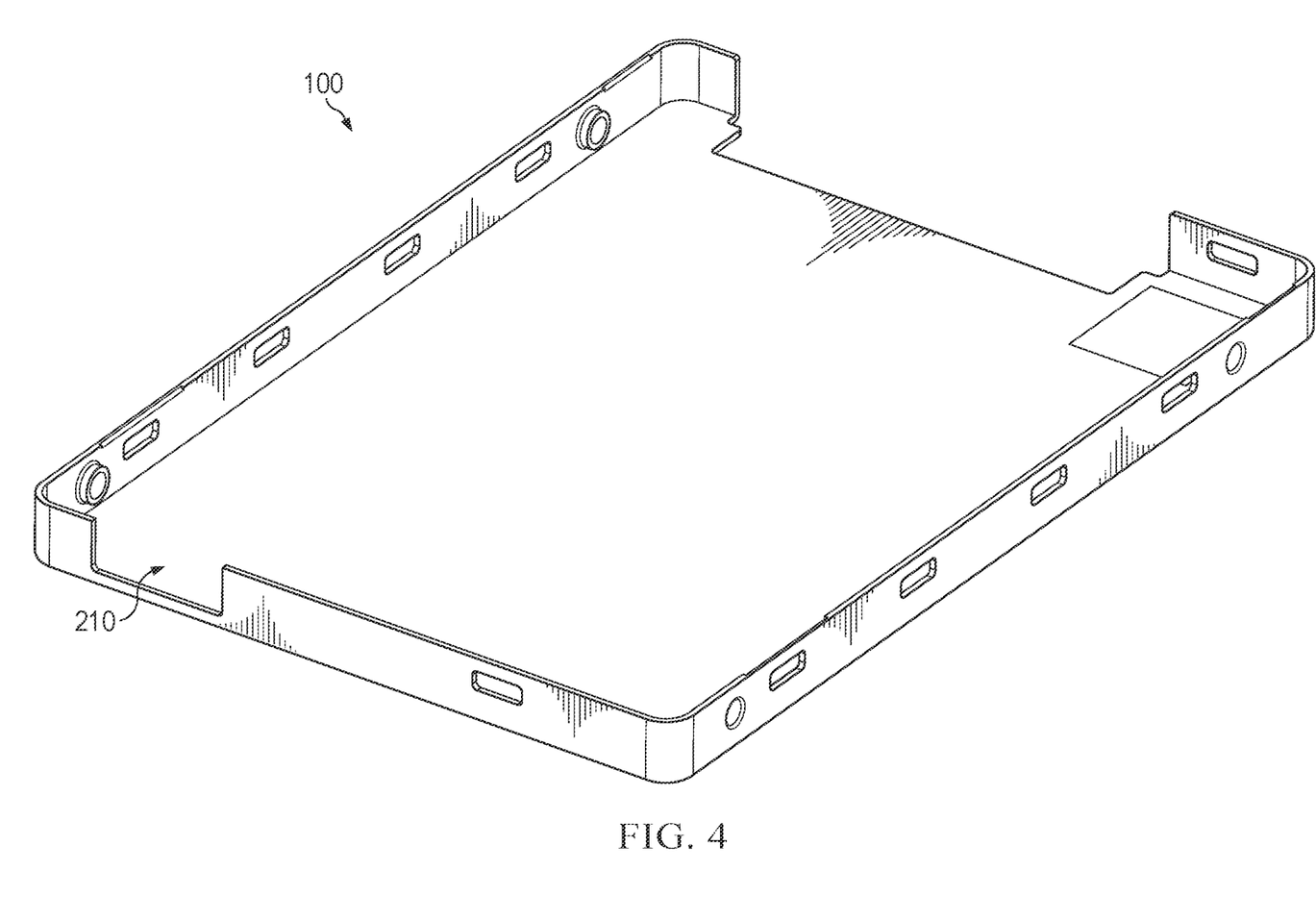
FIG. 4 illustrates an example memory enclosure that includes a debugger access portion in accordance with some embodiments of the present disclosure.

FIG. 4 illustrates an example outer portion of memory enclosure 100 that includes a debugger access portion 210 in accordance with some embodiments of the present disclosure. As shown in FIG. 4, when the anchoring joints 110 break and the breakaway tab 105 breaks away, memory enclosure 100 still includes debugger access portion 210. Debugger access portion 210 may be a hole or cut out situated to allow the access of a debugger tool into the interior of memory enclosure 100.

FIG. 5 illustrates a bottom view of an example memory enclosure 100 that includes an enclosure gap 515 in accordance with some embodiments of the present disclosure. As shown in FIG. 5, memory enclosure 100 includes an outer portion 510 and an inner portion 520. The outer portion 510 and the inner portion 520 may be coupled together such that they form a single enclosure, such as memory enclosure 100. For example, outer portion 510 and inner portion 520 may have mounting hardware such that they may be coupled together using screws or other coupling devices.

In some embodiments, breakaway tab 105 is located on outer portion 510. Breakaway tab 105 can be easily grabbed or gripped due to its placement on memory enclosure 100. For example, breakaway tab 105 is situated adjacent to an enclosure gap 515. Enclosure gap 515 is a gap defined by the space between outer portion 510 and inner portion 520. The bottom portion of breakaway tab 105 is situated such that a tool or a portion of a tool can enter enclosure gap 515 and grab or otherwise interact with breakaway tab 105 such that a user of the tool can apply a breaking force.

In some embodiments, breakaway tab 105, outer portion 510, enclosure gap 515, and inner portion 520 are all situated such that a user applying a breaking force by grabbing or otherwise interacting with breakaway tab 105 would not cause substantial damage to inner portion 520.

Figure 6:
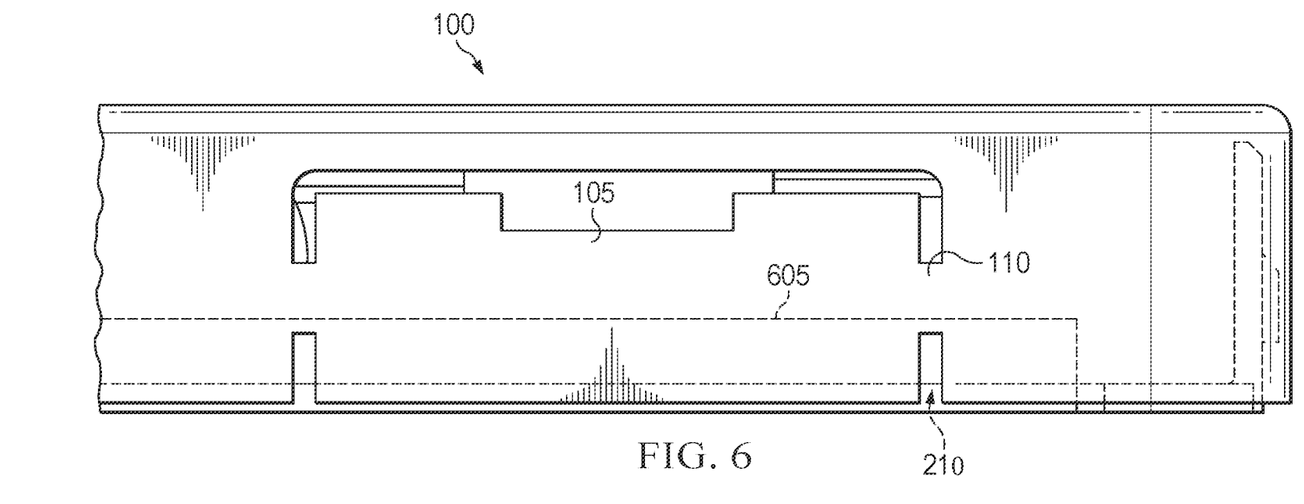
FIG. 6 illustrates an example of a memory enclosure that includes a support bar in accordance with some embodiments of the present disclosure.

FIG. 6 illustrates an example of a memory enclosure that includes a support bar 605 in accordance with some embodiments of the present disclosure. As shown in FIG. 6, support bar 605 may be a bar adjacent to debugger access portion 210 providing a backstop for the breakaway tab, such as breakaway tab 105 when the breakaway tab is still in place.

In some embodiments, support bar 605 prevents the breakaway tab, such as breakaway tab 105, from moving too much in a direction that could cause premature breakage of the anchoring joints, such as anchoring joints 110. For example, support bar 605 is situated such that the transport and use of memory enclosure 100 would not cause breakaway tab 105 to rotate along an axis defined by the anchoring joints. Support bar 605 therefore prevents stress and potential damage to the anchoring joints which may result in premature breakage.

In some embodiments, support bar 605 provides a pivot point, allowing the breakaway tab to break away more easily with the application of a breaking force. For example, support bar 605 is situated behind and near the bottom of the breakaway tab. When a user applies a breaking force to the breakaway tab, support bar 605 acts as a pivot point preventing unnecessary force from being applied to other portions of the memory enclosure 100. As the breaking force is applied to breakaway tab 105, breakaway tab 105 makes contact with support bar 605 preventing further motion of breakaway tab 105. The force is therefore applied to anchoring joints 110 until the force is great enough to cause breakage in anchoring joints 110 allowing breakaway tab 105 to break away from memory enclosure 100.

In some embodiments, support bar 605 has a height such that support bar 605 acts as a physical barrier preventing unwanted motion of breakaway tab 105 and premature breakage of anchoring joints 110. For example, support bar 605 has a height extending beyond the height of the bottom section of debugger access portion 210. This allows support bar 605 to prevent premature breakage of anchoring joints 110 and also allows support bar 605 to serve as a pivot point during the application of the breaking force, causing stress and breakage in anchoring joints 110 while allowing the rest of memory enclosure 100 to remain substantially intact. Support bar 605 may have a height of 1.5 mm corresponding with two and a half times the thickness of the enclosure material.

Figure 7:
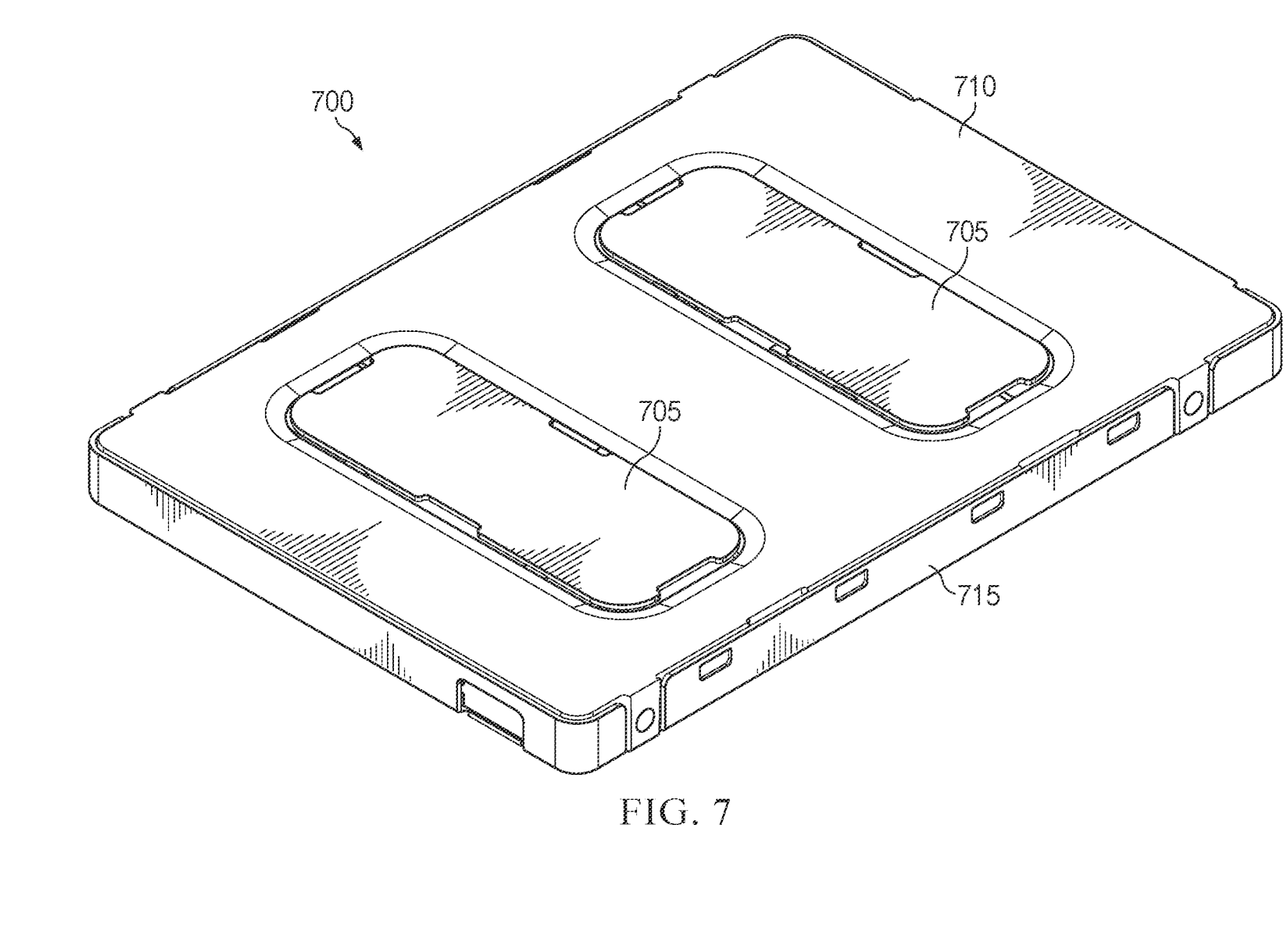
FIGS. 7 and 8 illustrate example memory enclosures that include two breakaway tabs in accordance with some embodiments of the present disclosure.
Figure 8:
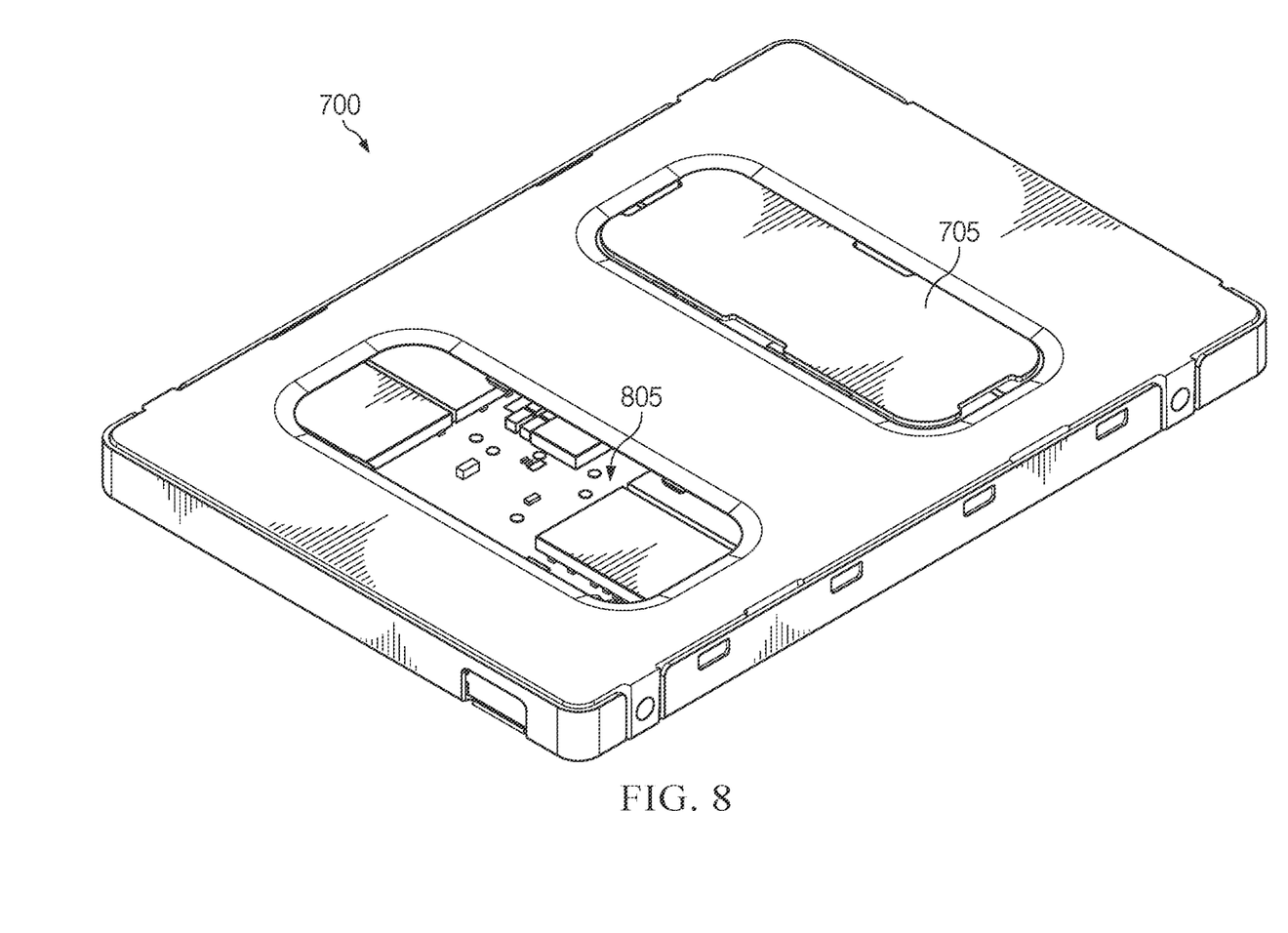

FIGS. 7 and 8 illustrate example memory enclosure 700 that includes two breakaway tabs 705 in accordance with some embodiments of the present disclosure. As shown in FIG. 7, memory enclosure 700 may include two breakaway tabs 705.

In some embodiments, breakaway tabs 705 are situated on inner enclosure 710 allowing for easy access to the interior of memory enclosure 700. For example, breakaway tabs 705 may be located on a large flat plane of inner enclosure 710 such that portions of the memory device inside memory enclosure 700 are exposed when breakaway tabs 705 break away.

As shown in FIG. 8, one of breakaway tabs 705 has been broken away from memory enclosure 700 through the application of a breaking force, allowing access to memory access portion 805. In some embodiments, memory access portion 805 allows for greater heat transfer out of the interior of memory enclosure 700. For example, memory access portion 805 provides airflow in/out of the interior of memory enclosure 700.

In some embodiments, having multiple breakaway tabs 705 allows for finer control of heat dissipation from the interior of memory enclosure 700. For example, a user may be aware that their use of a memory device substantially enclosed by memory enclosure 700 is likely to produce significant heat and potentially lead to overheating. In such a situation, a user may remove all breakaway tabs 705, leaving multiple memory access portions 805 for greater airflow reducing the risk of overheating. Alternatively, with lower overheating expectations, a user may want to leave at least one of breakaway tabs 705 in place, reducing the risk of foreign particulate entering the interior of memory enclosure 700 and potentially interfering with the operation of the memory device inside.

In some embodiments, the breakaway tabs 705 may allow access and connection to various connectors located in the interior of memory enclosure 700. For example, the breakaway tab(s) 705 can provide access to a memory expansion connector in the interior of memory enclosure 700. A user can remove one or more of the breakaway tabs 705 and insert memory expansion cards to add memory capacity to the memory device. Having multiple breakaway tabs 705 allows the user to determine how many expansion cards to add to the memory device.

In some embodiments, memory enclosure 700 has anchoring joints connecting breakaway tabs 705 to the rest of memory enclosure 700. These anchoring joints may be situated according to embodiments described previously, allowing for the removal of breakaway tabs 705 in response to the application of a breaking force.

Figure 9:
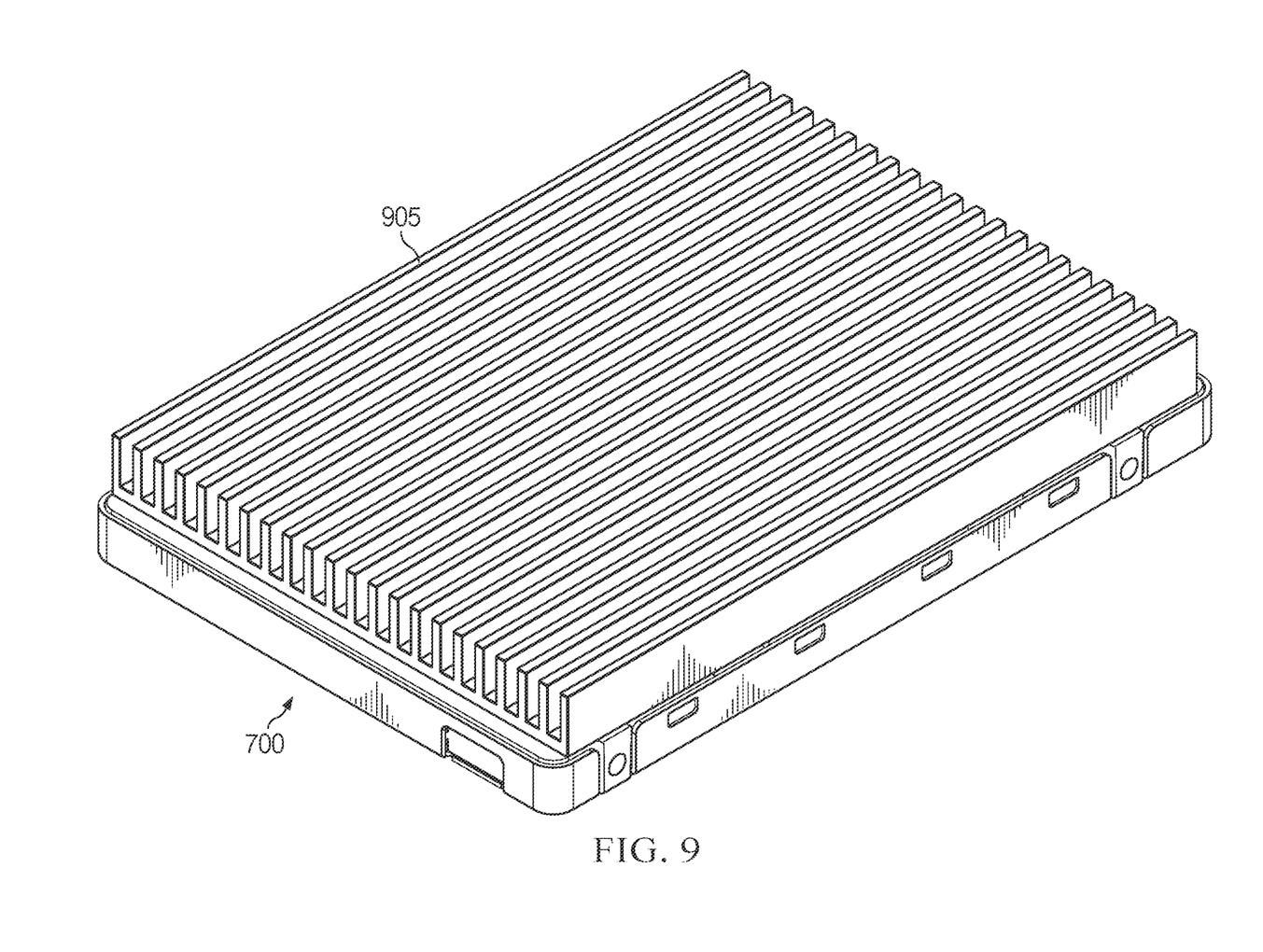
FIG. 9 illustrates an example memory enclosure that includes a heat sink in accordance with some embodiments of the present disclosure.

FIG. 9 illustrates an example memory enclosure that includes a heat sink 905 in accordance with some embodiments of the present disclosure. Heat sink 905 may be coupled to memory enclosure 700. For example, heat sink 905 may be coupled to the inner enclosure, such as inner enclosure 710 of memory enclosure 700. Heat sink 905 may be an active or passive heat exchanging element that allows for heat dissipation out of the interior of memory enclosure 700.

In some embodiments, heat sink 905 is constructed as part of memory enclosure 700. For example, heat sink 905 is constructed on one side of an inner enclosure, such as inner enclosure 710. In other embodiments, heat sink 905 is coupled to memory enclosure 700. For example, heat sink 905 is coupled to one side of inner enclosure allowing heat to transfer from the interior of memory enclosure 700 through memory access portion 805 into heat sink 905. Heat sink 905 may then dissipate the heat away from memory enclosure 700.

Although heat sink 905 as displayed in FIG. 9 illustrates a passive, finned heat sink, heat sink 905 may be made of many different materials and may be made in many different shapes and configurations. Heat sink 905 is not limited to passive, finned heat sinks but may incorporate active heat sink designs as well as alternative passive heat sink designs.

In the preceding description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within an enclosure would mean that the object is either completely within an enclosure or nearly completely within an enclosure. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The embodiments presented herein are not inherently related to any particular computer or other apparatus. Various general-purpose systems can be used in accordance with the teachings herein, or it can prove convenient to construct a more specialized apparatus to perform the method. The structure for a variety of these systems will appear as set forth in the description above.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory enclosure comprising:
   a debugger connector access portion in the memory enclosure;
   a breakaway tab, wherein the breakaway tab at least partially covers the debugger connector access portion;
   at least two anchoring joints connecting the breakaway tab to a portion of the memory enclosure surrounding the debugger connector access portion, the anchoring joints adapted to break upon application of a breaking force causing the breakaway tab to break away from the memory enclosure and allow a debugger tool access through an exterior of the memory enclosure to a debugger connector situated in an interior of the memory enclosure; and
   a support bar situated behind the breakaway tab on a bottom portion of the breakaway tab, wherein the support bar acts as a pivot point while the breaking force is applied.

2. The memory enclosure of claim 1, wherein the breakaway tab is substantially rectangular and wherein the at least two anchoring joints are positioned on short ends of the breakaway tab.

3. The memory enclosure of claim 1, wherein a width of the at least two anchoring joints is no more than two and a half times a thickness of a material of the memory enclosure.

4. The memory enclosure of claim 3, wherein the material of the memory enclosure is sheet metal.

5. The memory enclosure of claim 4, wherein the thickness of the material of the memory enclosure is 0.6 millimeters.

6. The memory enclosure of claim 1, wherein the memory enclosure is an enclosure for a solid-state drive.

7. A memory enclosure comprising:
   a debugger connector access portion in the memory enclosure;
   a breakaway tab, wherein the breakaway tab at least partially covers the debugger connector access portion;
   at least two anchoring joints connecting the breakaway tab to a portion of the memory enclosure surrounding the debugger connector access portion, the anchoring joints adapted to break upon application of a breaking force causing the breakaway tab to break away from the memory enclosure and allow debugger tool access through an exterior of the memory enclosure to a debugger connector situated in an interior of the memory enclosure;
   a support bar situated behind the breakaway tab on a bottom portion of the breakaway tab, wherein the support bar acts as a pivot point while the breaking force is applied;
   an outer portion of the memory enclosure comprising the debugger connector access portion, the breakaway tab, and the at least two anchoring joints; and
   an inner portion of the memory enclosure, wherein there is an enclosure gap between the outer portion and the inner portion such that the breakaway tab can be gripped from a side between the inner and outer portions and a side opposite the inner portion.

8. The memory enclosure of claim 7, wherein the breakaway tab is substantially rectangular and wherein the two anchoring joints are positioned on short ends of the breakaway tab.

9. The memory enclosure of claim 7, wherein a width of the at least two anchoring joints is no more than two and a half times a thickness of a material of the memory enclosure.

10. The memory enclosure of claim 9, wherein the material of the memory enclosure is sheet metal.

11. The memory enclosure of claim 10, wherein the thickness of the material of the memory enclosure is 0.6 millimeters.

12. The memory enclosure of claim 7, wherein the memory enclosure is an enclosure for a solid-state drive.

13. A memory enclosure comprising:
   a debugger connector access hole in the memory enclosure adapted to allow access of a debugger connector to internal components of the memory enclosure;
   a breakaway tab wherein the breakaway tab substantially covers the debugger connector access hole;
   at least two anchoring joints connecting the breakaway tab to a portion of the memory enclosure surrounding the debugger connector access portion, the anchoring joints adapted to break upon application of a breaking force causing the breakaway tab to break away from the memory enclosure and allow a debugger tool access through an exterior of the memory enclosure to a debugger connector situated in an interior of the memory enclosure;
   a support bar situated behind the breakaway tab on a bottom portion of the breakaway tab, wherein the support bar acts as a pivot point while the breaking force is applied;
   a heat sink configured to dissipate heat from the memory enclosure;
   an outer portion of the memory enclosure comprising the debugger connector access portion, the breakaway tab, and the at least two anchoring joints; and
   an inner portion of the memory enclosure comprising the support bar and the heat sink, wherein there is an enclosure gap between the outer portion and the inner portion such that the breakaway tab can be gripped from a side between the inner and outer portions and a side opposite the inner portion.

14. The memory enclosure of claim 13, wherein the breakaway tab is substantially rectangular and wherein the two anchoring joints are positioned on short ends of the breakaway tab.

15. The memory enclosure of claim 13, wherein a width of the at least two anchoring joints is no more than two and a half times a thickness of a material of the memory enclosure.

16. The memory enclosure of claim 15, wherein the material of the memory enclosure is sheet metal.

17. The memory enclosure of claim 13, wherein the memory enclosure is an enclosure for a solid-state drive.

18. The memory enclosure of claim 16, wherein the thickness of the material of the memory enclosure is 0.6 millimeters.

19. The memory enclosure of claim 13, wherein the support bar secures the breakaway tab in place until the breaking force is applied.

20. The memory enclosure of claim 11, wherein the support bar secures the breakaway tab in place until the breaking force is applied.

* * * * *